United States Patent
Hu et al.

(10) Patent No.: US 11,184,131 B2
(45) Date of Patent: Nov. 23, 2021

(54) METHOD AND APPARATUS FOR TRANSMITTING REFERENCE SIGNAL

(71) Applicant: HUAWEI TECHNOLOGIES CO., LTD., Guangdong (CN)

(72) Inventors: Yuanzhou Hu, Shanghai (CN); Mengying Ding, Shanghai (CN); Pengpeng Dong, Shanghai (CN); Zongjie Wang, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 96 days.

(21) Appl. No.: 16/662,736

(22) Filed: Oct. 24, 2019

(65) Prior Publication Data
US 2020/0059335 A1 Feb. 20, 2020

Related U.S. Application Data

(63) Continuation of application No. PCT/CN2018/091328, filed on Jun. 14, 2018.

(30) Foreign Application Priority Data

Jun. 30, 2017 (CN) .................. 201710527958.X

(51) Int. Cl.
*H04L 5/00* (2006.01)
*H04L 27/20* (2006.01)
*H04W 72/04* (2009.01)

(52) U.S. Cl.
CPC ............ *H04L 5/0048* (2013.01); *H04L 27/20* (2013.01); *H04W 72/0413* (2013.01); *H04W 72/0453* (2013.01)

(58) Field of Classification Search
CPC ..... H04L 5/0048; H04L 27/20; H04L 5/0094; H04L 5/0051; H04L 27/261;
(Continued)

(56) References Cited

U.S. PATENT DOCUMENTS

2009/0052427 A1* 2/2009 Oketani ................ H04L 27/261
370/347
2009/0323796 A1  12/2009 Futatsugi et al.
(Continued)

FOREIGN PATENT DOCUMENTS

CN       101621327 A       1/2010
CN       103297371 A       9/2013
CN       106027452 A      10/2016

OTHER PUBLICATIONS

Huawei, "Spectrum-shaping function for E-UTRA uplink" 3GPP TSG RAN WG1 Meeting #47bis,R1-070115,Sorrento, Italy, Jan. 15-19, 2007, 11 pages.
(Continued)

*Primary Examiner* — Kiet Tang
(74) *Attorney, Agent, or Firm* — Fish & Richardson P.C.

(57) ABSTRACT

The present disclosure relates to sending methods and apparatus. One example method includes receiving first indication information for uplink data transmission, where the first indication information indicates a frequency resource for the uplink data transmission, and the frequency resource includes N subcarriers, and sending an uplink reference signal associated with the uplink data transmission, where a length of a sequence of the uplink reference signal is M, a roll-off factor of a filter for the uplink data transmission is not greater than $$\frac{2M}{N} - 1,$$

and N/2≤M<N.

14 Claims, 3 Drawing Sheets

(58) Field of Classification Search
CPC ............... H04L 5/0001; H04L 5/0035; H04W 72/0413; H04W 72/0453; H04W 72/04; H04W 72/0406
See application file for complete search history.

(56) References Cited

U.S. PATENT DOCUMENTS

| | | |
|---|---|---|
| 2014/0003544 A1 | 1/2014 | Oketani et al. |
| 2017/0134205 A1 | 5/2017 | Kim et al. |
| 2018/0083749 A1* | 3/2018 | Lee ..................... H04L 5/0035 |

OTHER PUBLICATIONS

Extended European Search Report issued in European Application No. 18824383.6 dated Feb. 24, 2020, 8 pages.

Intel Corporation et al., "Further discussion on SRS for NR" 3GPP TSG RAN WG1 NR Ad-Hoc meeting, Spokane, USA,R1-1700356, Jan. 16-20, 2017, 11 pages.

Intel Corporation, "Discussion on SRS for NR" 3GPP TSG RAN WG1 Meeting #88bis,Spokane, USA, R1-1704737, Apr. 3-7, 2017, 6 pages.

Huawei et al., "Performance evaluation for pi / 2 BPSK with FDSS" 3GPP TSG RAN WG1 Meeting # 88bis, R1-1705060, Apr. 7, 2017, 10 pages.

Huawei et al., "UL SRS sequence design in NR" 3GPP TSG RAN WG1 Meeting # 89, R1-1708171, May 19, 2017, 8 pages.

PCT International Search Report and Written Opinion in International Application No. PCT/CN2018/091,328, dated Sep. 18, 2018, 12 pages (With Partial English Translation).

Office Action issued in Chinese Application No. 201710527958.X dated Mar. 30, 2020, 6 pages.

* cited by examiner

METHOD AND APPARATUS FOR TRANSMITTING REFERENCE SIGNAL

CROSS-REFERENCE TO RELATED APPLICATIONS

This application is a continuation of International Application No. PCT/CN2018/091328, filed on Jun. 14, 2018, which claims priority to Chinese Patent Application No. 201710527958.X, filed on Jun. 30, 2017. The disclosures of the aforementioned applications are hereby incorporated by reference in their entireties.

TECHNICAL FIELD

This application relates to the field of mobile communications technologies, and in particular, to a sending method and apparatus.

BACKGROUND

A communications system can be divided into three parts: a sending device, a channel, and a receiving device. The channel is a transmission channel for a signal, and may be understood as a transmission medium for the signal. Based on different transmission media, the communications system can be classified into a wired communications system and a wireless communications system. Due to a non-ideal feature of a transmission medium, especially for a wireless communications system, distortion always occurs in signal transmission. In other words, a signal received by a receiving device is not exactly the same as a signal originally sent from a sending device. A difference between the signal received by the receiving device and the signal originally sent from the sending device is signal distortion. In addition, signal distortion depends on a channel feature. Therefore, estimation of the channel feature helps to offset signal distortion and improves performance of the communications system.

A reference signal (RS) is a signal whose content is known, and is also referred to as a pilot signal sometimes. The content of the reference signal, that is, a reference signal sequence carried in the reference signal, is generally pre-agreed on in a communications system. Therefore, before receiving a reference signal, a receiving device may learn of content of the reference signal based on a system configuration. Subsequently, the receiving device obtains a reference signal sequence from the received reference signal, and compares the reference signal sequence with an expected reference signal sequence, so as to estimate a channel feature. The channel feature estimated by the receiving device may be used for demodulation of a data signal. The data signal is a signal that carries data information. Unlike the reference signal, content of the data signal, that is, the data information, is unknown to the receiving device. However, through the estimated channel feature, the receiving device can still correctly obtain, through demodulation, the data information from the data signal transmitted on a channel, so as to achieve a communication purpose.

In a long term evolution (LTE) system of the 4th generation (4G) mobile communications, an uplink reference signal includes a demodulation reference signal (DMRS or DM-RS) and a sounding reference signal (SRS). An uplink direction is a transmission direction from a terminal to a base station. Correspondingly, a downlink direction is a transmission direction from the base station to the terminal. The DMRS is mainly used for performing demodulation on a physical uplink channel. Therefore, the base station can correctly obtain, through demodulation, data information on the physical uplink channel. The physical uplink channel herein includes a physical uplink shared channel (PUSCH) or a physical uplink control channel (PUCCH). The SRS is mainly used for quality estimation of an uplink channel on different frequency bands. Therefore, the base station can effectively allocate an appropriate resource and transmission parameter for uplink transmission. The DMRS is located inside a frequency band of a PUSCH or a PUCCH and transmitted together with the PUSCH or the PUCCH, so as to demodulate the PUSCH or the PUCCH associated with the DMRS. Unlike the DMRS, the SRS is not necessarily transmitted together with any physical uplink channel. In addition, if the SRS is transmitted together with a physical uplink channel (for example, a PUSCH), the SRS usually occupies a different frequency band that is usually larger.

As technologies evolve, a technical specification (TS) of a new mobile communications system is also being constantly studied and formulated. For example, in a 5th generation (5G) mobile communications system, a wireless transmission technology used between a terminal and a base station may be redesigned. Therefore, this part of technical specification is referred to as 5G new radio (NR) or 5G new air interface. Compared with 4G LTE, new technical solutions are introduced to all various aspects of 5G NR, for example, a frequency spectrum, encoding, modulation, and a waveform. Therefore, new technical solutions need to be provided continuously, so as to adapt to evolution of wireless transmission technologies and improve wireless communication performance.

SUMMARY

This application provides a sending method and apparatus, to improve wireless communication performance.

To achieve the foregoing objective, this application provides following technical solutions:

According to a first aspect, a sending method is provided, where the method is performed by a sending apparatus. The sending apparatus may be, for example, a terminal. The method includes: receiving first indication information for uplink data transmission, where the first indication information is used to indicate a frequency resource for the uplink data transmission, and the frequency resource includes N subcarriers, and sending an uplink reference signal associated with the uplink data transmission, where a length of a sequence of the uplink reference signal is M; and a roll-off factor of a filter for the uplink data transmission is not greater than $$\frac{2M}{N} - 1,$$

and N/2≤M<A, where N is a positive integer, and M is a positive integer. After the filter filters uplink data, the obtained uplink data includes N−M pieces of data that are 0 or close to 0 and M pieces of non-zero data. A receiving apparatus can obtain, through demodulation, all N pieces of data by only processing the M pieces of non-zero data of the N pieces of uplink data that are received. Therefore, during channel estimation, the receiving apparatus only needs M uplink reference signals corresponding to the M pieces of non-zero data. Therefore, the sending apparatus only needs to send the M uplink reference signals. A length of a sequence of an uplink reference signal can be adjusted flexibly, and therefore it is easier to find an uplink reference signal sequence with a low peak to average power ratio (PAPR) and a low raw cubic metric (RCM), so that the PAPR and the RCM of the uplink reference signal sequence may be close to or even lower than those of the uplink data, so as to ensure that the receiving apparatus can accurately obtain, through demodulation, the received uplink data, thereby improving wireless communication performance.

In a possible design, the length of the sequence of the uplink reference signal is determined based on received second indication information. To be specific, the receiving apparatus sends the second indication information to the sending apparatus, where the second indication information indicates the length of the sequence of the uplink reference signal.

In a possible design, a frequency resource occupied by the sequence of the uplink reference signal is M intermediate subcarriers of the N subcarriers. In this case, the receiving apparatus can correctly obtain, through demodulation, by using the received uplink reference signal, the received uplink data mapped to the N subcarriers.

In a possible design, a modulation scheme of the uplink data transmission is π/2 binary phase shift keying (BPSK). Both a PAPR and an RCM of data obtained through π/2 BPSK modulation are relatively low, so that correctness of demodulating data by the receiving apparatus is improved.

In a possible design, when M=10, the sequence of the uplink reference signal is one of Y(q), where Y(q)=(y(0), y(1), ..., y(9)), and q=0, 1, ..., 31, as listed in the following table:

The foregoing method provides a specific design scheme used for the sequence of the uplink reference signal when M=10. When a sequence of an uplink reference signal with a length of 10 needs to be used, the sequence may be directly obtained from the table, so as to improve communication efficiency.

In a possible design, the sequence of the uplink reference signal is a Golay sequence, and the Golay sequence is generated from at least one of the following complementary base sequences:

a complementary base sequence with a length of 10: [[1,1,-1,1,-1,1,-1,-1,1,1], [1,1,-1,1,1,1,1,1,-1,-1]] or [[1, 1,1,1,-1,1,-1,-1,1], [1,1,-1,-1,1,1,1,-1,1,-1]];

a complementary base sequence with a length of 16: [[-1,1,1,1,-1,1,-1,-1,1,1,-1,1,1,1,1,-1], [-1,1,1,1,1,-1,1,1, 1,1,-1,1,-1,-1,-1,1]]; and a complementary base sequence with a length of 26: [[1,1,1,1,-1,1,1,-1,-,1,1,-1,1,-1,1,-1,-1,1,-1,1,1,1,-1,-1, 1,1,1], [1,1,1,1,-1,1,1,-1,-1,1,-1,1,1,1,1,1,-1,1,-1,-1,-1, 1,1,-1,-1,-1]]. To be specific, the foregoing method provides a method for generating a sequence of an uplink reference signal. A sequence of an uplink reference signal is a Golay sequence, and is generated through one or more of the complementary base sequences with a length of 10, the complementary base sequence with a length of 16, and the complementary base sequence with a length of 26.

In a possible design, the sequence of the uplink reference signal is a Golay sequence, and $M=2^a*10^b*26^c$, where a is a non-negative integer, b is a non-negative integer, c is a non-negative integer, and M is a maximum value of all possible values. When a value of M is the maximum value of all the possible values, it is beneficial to reduce a PAPR and an RCM of an uplink reference signal.

| Y(q)   | y(0) | y(1) | y(2) | y(3) | y(4) | y(5) | y(6) | y(7) | y(8) | y(9) |
|--------|------|------|------|------|------|------|------|------|------|------|
| Y(0)   | 1    | 1    | -1   | 1    | -1   | 1    | -1   | -1   | 1    | 1    |
| Y(1)   | 1    | 1    | -1   | 1    | 1    | 1    | 1    | 1    | -1   | -1   |
| Y(2)   | 1    | 1    | -1   | -1   | 1    | -1   | 1    | -1   | 1    | 1    |
| Y(3)   | -1   | -1   | 1    | 1    | 1    | 1    | 1    | -1   | 1    | 1    |
| Y(4)   | 1    | -1   | -1   | 1    | 1    | 1    | 1    | 1    | 1    | -1   |
| Y(5)   | -1   | 1    | 1    | -1   | 1    | -1   | 1    | 1    | 1    | -1   |
| Y(6)   | -1   | 1    | 1    | 1    | 1    | 1    | 1    | -1   | -1   | 1    |
| Y(7)   | -1   | 1    | 1    | 1    | -1   | 1    | -1   | 1    | 1    | -1   |
| Y(8)   | 1    | 1    | 1    | 1    | 1    | -1   | 1    | -1   | -1   | 1    |
| Y(9)   | 1    | 1    | -1   | -1   | 1    | 1    | 1    | -1   | 1    | -1   |
| Y(10)  | 1    | -1   | -1   | 1    | -1   | 1    | 1    | 1    | 1    | 1    |
| Y(11)  | -1   | 1    | -1   | 1    | 1    | 1    | -1   | -1   | 1    | 1    |
| Y(12)  | 1    | 1    | -1   | -1   | -1   | -1   | 1    | -1   | 1    | -1   |
| Y(13)  | -1   | -1   | -1   | -1   | 1    | -1   | -1   | 1    | 1    | -1   |
| Y(14)  | -1   | 1    | -1   | 1    | -1   | -1   | -1   | -1   | 1    | 1    |
| Y(15)  | -1   | 1    | 1    | -1   | -1   | 1    | -1   | -1   | -1   | -1   |
| Y(16)  | -1   | 1    | -1   | 1    | -1   | -1   | 1    | 1    | 1    | 1    |
| Y(17)  | 1    | -1   | 1    | 1    | 1    | 1    | 1    | -1   | -1   | 1    |
| Y(18)  | 1    | 1    | 1    | 1    | -1   | -1   | 1    | -1   | 1    | -1   |
| Y(19)  | 1    | -1   | -1   | 1    | 1    | 1    | 1    | 1    | -1   | 1    |
| Y(20)  | 1    | -1   | 1    | -1   | -1   | 1    | 1    | 1    | 1    | 1    |
| Y(21)  | -1   | -1   | 1    | 1    | -1   | 1    | -1   | 1    | 1    | 1    |
| Y(22)  | 1    | 1    | 1    | 1    | 1    | -1   | -1   | 1    | -1   | 1    |
| Y(23)  | 1    | 1    | 1    | -1   | 1    | -1   | 1    | 1    | -1   | -1   |
| Y(24)  | 1    | 1    | 1    | 1    | -1   | 1    | -1   | -1   | 1    | 1    |
| Y(25)  | -1   | 1    | -1   | 1    | 1    | -1   | -1   | 1    | 1    | 1    |
| Y(26)  | 1    | 1    | -1   | -1   | 1    | -1   | 1    | 1    | 1    | 1    |
| Y(27)  | 1    | 1    | 1    | -1   | -1   | 1    | 1    | -1   | 1    | -1   |
| Y(28)  | -1   | 1    | 1    | -1   | -1   | -1   | 1    | 1    | -1   | 1    |
| Y(29)  | -1   | 1    | -1   | -1   | 1    | 1    | -1   | -1   | -1   | -1   |
| Y(30)  | 1    | -1   | 1    | -1   | -1   | -1   | -1   | 1    | 1    | -1   |
| Y(31)  | -1   | -1   | -1   | -1   | 1    | 1    | -1   | -1   | 1    | -1   |

According to a second aspect, an embodiment of the present invention provides a sending apparatus. The sending apparatus is, for example, a terminal, or may be a chip in a terminal. The sending apparatus has a function for implementing the foregoing method embodiment. The function may be implemented by hardware or may be implemented by hardware by executing corresponding software. The hardware or the software includes one or more modules corresponding to the foregoing function.

According to a third aspect, an embodiment of the present invention provides a sending apparatus. The sending apparatus is, for example, a terminal, or may be a chip in a terminal. The sending apparatus includes a processor and a memory. The memory stores a computer execution instruction. The processor is connected to the memory and the processor executes the computer execution instruction stored in the memory, so that the sending apparatus performs the sending method according to any one of the possible designs in the first aspect.

According to a fourth aspect, this application provides a computer storage medium, storing a computer software instruction used by the foregoing sending apparatus, where the computer software instruction includes a program designed for the sending apparatus to perform the method in the foregoing aspect.

According to a fifth aspect, this application provides a computer program product. The computer program product includes a computer software induction, where the computer software induction may be loaded by a processor to implement a process of the sending method according to any one of the possible designs of the first aspect.

In addition, for a technical effect brought by any design manner in the second aspect to the fifth aspect, refer to technical effects brought by different design manners in the first aspect. Details are not described herein again.

These or other aspects of the present invention are more concise and comprehensible in descriptions of the following embodiments.

DESCRIPTION OF DRAWINGS

FIG. 4(*b*) is another schematic diagram of mapping data to subcarriers of a frequency resource according to this application;

DESCRIPTION OF EMBODIMENTS

The following describes technical solutions of this application with reference to accompanying drawings of this application. A specific operation method in a method embodiment may also be applied to an apparatus embodiment or a system embodiment. In descriptions of this application, unless otherwise noted, a meaning of "a plurality of" is two or more.

An architecture and a service scenario described in this application are intended to describe the technical solutions of this application more clearly, but do not constitute any limitation to the technical solutions provided in this application. A person of ordinary skill in the art may know that, as a network architecture evolves and a new service scenario emerges, the technical solutions provided in this application are also applicable to a similar technical problem.

Figure 1:
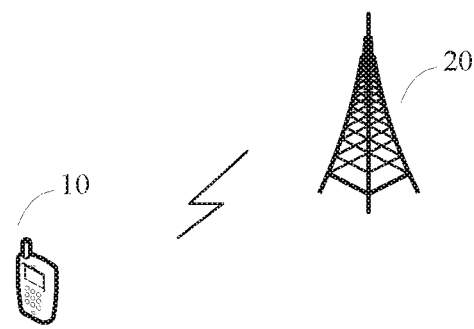
FIG. 1 is a schematic diagram of a possible network architecture according to this application.

FIG. 1 is a schematic diagram of a possible network architecture according to this application. The network architecture includes at least one terminal 10, where the terminal 10 communicates with a base station 20 through a radio interface. For clarity, the figure shows only one base station and one terminal.

The terminal is a device with wireless receiving and sending functions. The terminal may be deployed on land, including an indoor device, an outdoor device, a handheld device, or an in-vehicle device; may be deployed on the surface of water (for example, in a steamship); or may be deployed in air (for example, on an airplane, a balloon, and a satellite). The terminal may be a mobile phone, a tablet computer (pad), a computer with wireless receiving and sending functions, a virtual reality (VR) terminal, an augmented reality (AR) terminal, a wireless terminal used in industrial control, a wireless terminal used in self driving, a wireless terminal used in a remote medical application, a wireless terminal in a smart grid, a wireless terminal used in transportation safety, a wireless terminal in a smart city, a wireless terminal in a smart home, or the like.

The base station is a device for connecting the terminal to a wireless network, and the base station includes but is not limited to: an evolved NodeB (eNB), a radio network controller (RNC), a NodeB (NB), a base station controller (BSC), a base transceiver station (BTS), a home NodeB (for example, a home evolved nodeB; or a home node B, HNB), a baseband unit (BBU), a gNodeB (gNB), a transmission/reception point (TRP), a transmission point (TP), and a mobile switching center. In addition, the terminal may alternatively include a Wi-Fi access point (AP) or the like.

In an uplink direction, the terminal may be referred to as a sending device or a sending apparatus, and the base station may be referred to as a receiving device or a receiving apparatus. In a downlink direction, the base station may be referred to as a sending device or a sending apparatus, and the terminal may be referred to as a receiving device or a receiving apparatus.

In this application, sending of a reference signal and data in the uplink direction is mainly considered. In the uplink direction, the reference signal sent by the terminal to the base station is also referred to as an uplink reference signal, and the data sent by the terminal to the base station is also referred to as uplink data.

To ensure accuracy of data received by a receiving device, generally, a sequence of a reference signal and data sent by a sending device need to have a relatively low PAPR and RCM, and preferably, the PAPR and the RCM of the sequence of the reference signal are respectively lower than those of the data, or in other words, a PAPR of the reference signal is lower than that of the data, and an RCM of the reference signal is lower than that of the data.

For example, in 4G LTE communication, when data is modulated through quadrature phase shift keying (QPSK), correspondingly, a sequence of a reference signal is generated by using a Zadoff-Chu (ZC) sequence. In this case, both a PAPR and an RCM of the data are relatively low, and a PAPR and an RCM of the sequence of the reference signal are relatively close to those of the data, and therefore very good performance is achieved.

Currently, as a communications standard evolves, in 5G NR communication, when a π/2 BPSK modulation scheme is introduced to adjust data, a PAPR and an RCM of the data that are obtained when the π/2 BPSK modulation scheme is used are reduced much more than those obtained when a QPSK modulation scheme is used. Particularly, when a filter is further used based on the π/2 BPSK modulation scheme, the PAPR and the RCM of the data are further reduced. In this case, if a ZC sequence is still used as a sequence of a reference signal, a PAPR and an RCM of the sequence of the reference signal are respectively much higher than those of the data, waveform attenuation and power back-off generated after the data is processed by a radio frequency power amplifier are inconsistent with those generated after the reference signal is processed by the radio frequency power amplifier, and waveform attenuation and power back-off of the reference signal may be more serious. As a result, errors of channel estimation and equalization by the receiving device are increased, and a BLER loss is caused.

Therefore, in the uplink direction, how the sending device sends an uplink reference signal to ensure that a PAPR and an RCM of the uplink reference signal can be close to or even lower than those of data needs a solution.

Figure 3:
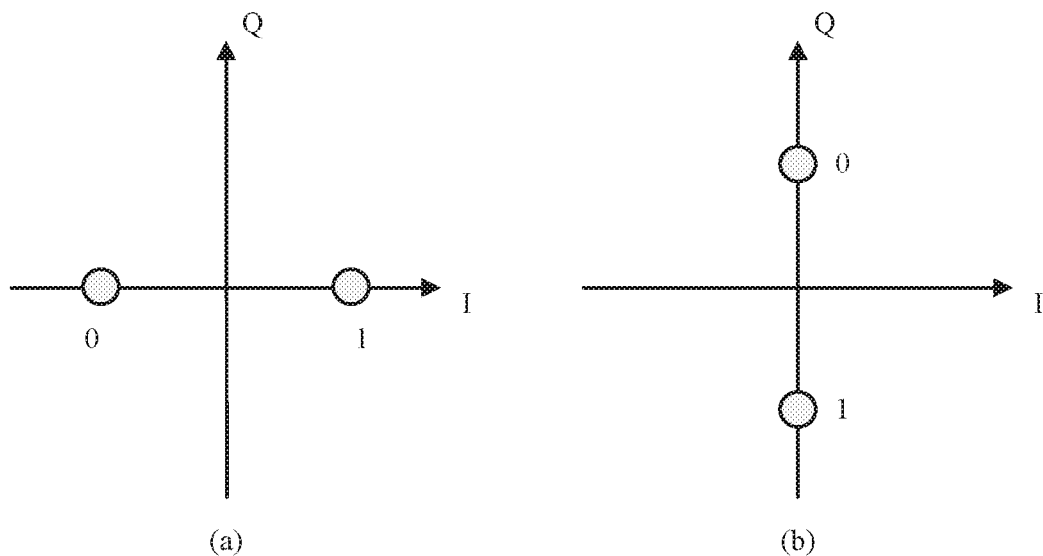
FIG. 3 is a constellation diagram of a modulation symbol of π/2 BPSK according to this application.

FIG. 3 is a constellation diagram of a modulation symbol of π/2 BPSK according to this application. On the whole, during π/2 BPSK, four phases existing with a difference of π/2 may be used for transmitting information However, microscopically, for each modulation symbol, two phases with a difference of π are used for transmitting information. In addition, a phase difference between modulation symbols to which two adjacent bits are mapped is π/2. For example, it is assumed that a value set of phases that can be used during π/2 BPSK is {0, π/2, π, 3π/2}. For a bit in an odd-number location, one of two phases 0 and π may be used, as shown in FIG. 3(a). For a bit in an even-number location, one of two phases π/2 and 3π/2 may be used, as shown in FIG. 3(b). Through comparison between FIG. 3(a) and FIG. 3(b), it is easy to learn that a phase difference between two adjacent modulation symbols that are respectively in an odd-number position and an even-number location is π/2. Each modulation symbol has two possible phase values. Therefore, 1-bit information can be transmitted.

It should be noted that, the foregoing provides only example description of a modulation scheme of uplink data. To be specific, the π/2 BPSK modulation scheme is used for the uplink data; or when the π/2 BPSK modulation scheme is used, a filter is further used for filtering the uplink data. The filter may be, for example, a frequency-domain filter or a time-domain filter. However, it should be noted that, this application is not limited to using the foregoing scheme for data modulation. In this application, any data modulation scheme can be used as a data modulation scheme in this application, provided that in the data modulation scheme, a phase difference between two adjacent modulated data points is 90 degrees or 270 degrees and one of the data points is a real number. In this modulation scheme, magnitudes of the two adjacent data points may be inconsistent, and therefore this modulation scheme may not be π/2 BPSK modulation.

Figure 2:
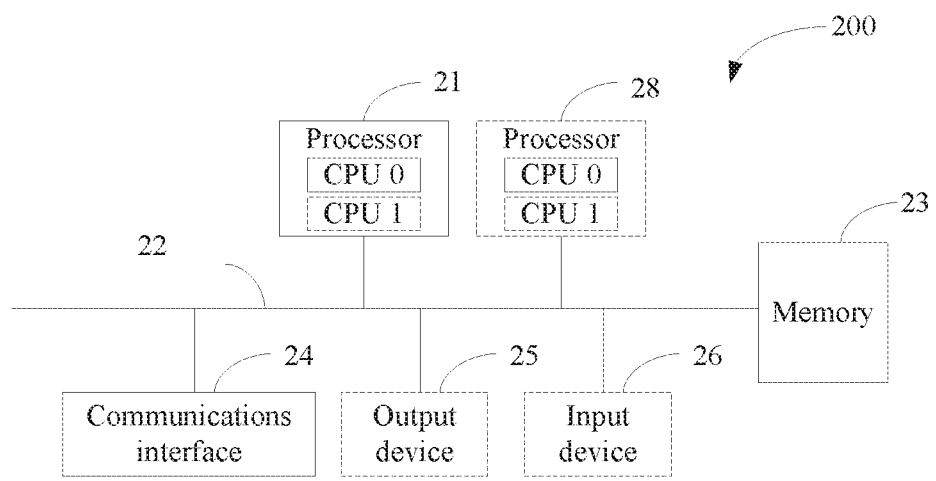
FIG. 2 is a schematic diagram of a sending apparatus according to this application.

FIG. 2 is a schematic diagram of a sending apparatus according to this application. The sending apparatus 200 includes at least one processor 21, a communications bus 22, a memory 23, and at least one communications interface 24.

The processor 21 may be a general purpose central processing unit (CPU), a microprocessor, an application-specific integrated circuit (ASIC), or one or more integrated circuits configured to control execution of a program of the solution of the present invention.

The communications bus 22 may include a channel and transfer information between the foregoing components. The communications interface 24 uses any apparatus like a transceiver to communicate with another device or a communications network, such as an Ethernet, a radio access network (RAN), a wireless local area network (WLAN).

The memory 23 may be a read-only memory (ROM), another type of static storage device that can store static information and an instruction, a random access memory (RAM), or another type of dynamic storage device that can store information and an instruction, or may be an electrically erasable programmable read-only memory (EE-PROM), a compact disc read-only memory (CD-ROM) or another optical disk storage, an optical disc storage (including a compact disc, a laser disc, an optical disc, a digital versatile disc, a Blu-ray optical disc, or the like), a magnetic disk storage medium or another magnetic storage device, or any other medium that can be accessed by a computer and that can be used to carry or store expected program code in an instruction or data structure form, but no limitation is not set thereto. The memory may exist independently, and is connected to a processor through a bus. The memory may be alternatively integrated into the processor.

The memory 23 is configured to store application program code used for executing the solutions of the present invention, and the processor 21 controls execution of the application program code. The processor 21 is configured to execute the application program code stored in the memory 23.

During specific implementation, in an embodiment, the processor 21 may include one or more CPUs, for example, a CPU 0 and a CPU 1 in FIG. 2.

During specific implementation, in an embodiment, the sending apparatus 200 may include a plurality of processors, for example, the processor 21 and a processor 28 in FIG. 2. Each of the processors may be a single-core processor (single-CPU), or may be a multi-core processor (multi-CPU). The processor herein may be one or more devices, a circuit, and/or a processing core used for processing data (for example, a computer program instruction).

In this application, the sending apparatus shown in FIG. 2 may be an implementation of the terminal in the system architecture shown in FIG. 1, and the sending apparatus may be configured to perform a sending method in this application.

When the sending apparatus shown in FIG. 2 is a terminal, during specific implementation, in an embodiment, the sending apparatus 200 may further include an output device 25 and an input device 26. The output device 25 communicates with the processor 21, and may display information in a plurality of manners. For example, the output device 25 may be a liquid crystal display (LCD), a light emitting diode (LED) display device, a cathode ray tube (CRT) display device, a projector, or the like. The input device 26 communicates with the processor 21, and may receive input from a user in a plurality of manners. For example, the input device 26 may be a mouse, a keyboard, a touchscreen device, a sensing device, or the like. The sending apparatus 200 may be a general purpose sending apparatus or a dedicated sending apparatus.

For example, the terminal in FIG. 1 may be the sending apparatus shown in FIG. 2, and the memory of the terminal stores one or more software modules. The terminal may implement the software module through the processor and the program code in the memory, to implement sending of uplink data and an uplink reference signal.

To reduce a PAPR and an RCM of a sequence of an uplink reference signal to make the PAPR and the RCM of the sequence of the uplink reference signal be close to or even lower than those of uplink data, this application provides a sending method. The sending method may be applied to the architecture shown in FIG. 1, and the sending method is performed by the terminal in FIG. 1. In an example, for a specific structure of the terminal shown in FIG. 1, refer to FIG. 2.

Step 1: The sending apparatus receives first indication information for uplink data transmission, where the first indication information is used to indicate a frequency resource for the uplink data transmission, and the frequency resource includes N subcarriers.

To be specific, a receiving apparatus sends the first indication information to the sending apparatus, where the first indication information indicates the frequency resource available for the uplink data transmission. Therefore, the sending apparatus may use the frequency resource to send uplink data and an uplink reference signal.

The frequency may also be referred to as a frequency-domain resource. The receiving apparatus may be, for example, a base station.

Step 2: The sending apparatus sends an uplink reference signal associated with the uplink data transmission, where a length of a sequence of the uplink reference signal is M.

In addition, the sending apparatus further sends the uplink data associated with the uplink data transmission. Because the frequency resource includes N subcarriers, there are N pieces of sent uplink data, that is, one piece of data is mapped to a frequency resource corresponding to each subcarrier.

A roll-off factor of a filter for the uplink data transmission is not greater than $$\frac{2M}{N} - 1,$$

and N/2≤M<N.

Optionally, the length M of the sequence of the uplink reference signal is determined based on received second indication information, for example, second indication information sent by the receiving apparatus, and the second indication information indicates that the length of the sequence of the uplink reference signal is M. After receiving the second indication information, the sending apparatus determines the length of the sequence of the uplink reference signal. Optionally, the length M of the sequence of the uplink reference signal may be alternatively pre-agreed on by the sending apparatus and the receiving apparatus, and stored locally by each of the sending apparatus and the receiving apparatus. Optionally, the length M of the sequence of the uplink reference signal may be alternatively obtained by the sending apparatus through calculation based on the roll-off factor of the filter, or in other words, when the roll-off factor of the filter is determined, the length of the sequence of the uplink reference signal can be determined through calculation.

In this application, the roll-off factor of the filter may be adjusted to make values of some data in filtered uplink data be 0 or close to 0, or in other words, the roll-off factor of the filter may be adjusted to adjust a length of non-zero data in the filtered uplink data. When performing channel estimation and equalization, the receiving apparatus only needs to process the non-zero data in the received uplink data. Therefore, the length of the sequence of the uplink reference signal only needs to be not less than that of the non-zero data in the filtered data, or in other words, the length of the sequence of the reference signal can be more flexibly adjusted through adjustment of a value of the roll-off factor. For example, in this application, when the roll-off factor of the filter is $$\frac{2M}{N} - 1,$$

after the filter filters the uplink data, the obtained uplink data includes N−M pieces of data that are 0 or close to 0 and M pieces of non-zero data. The receiving apparatus can obtain, through demodulation, all N pieces of data by only processing the M pieces of non-zero data of the N pieces of uplink data that are received. Therefore, during channel estimation, the receiving apparatus only needs M uplink reference signals corresponding to the M pieces of non-zero data. Therefore, the sending apparatus only needs to send the M uplink reference signals. However, in the prior art, the sending apparatus always sends N uplink reference signals when sending N pieces of uplink data.

In this application, the length of the sequence of the uplink reference signal that is sent can be adjusted flexibly, and therefore it is easier to find an uplink reference signal sequence with a low PAPR and a low RCM, so that a PAPR and an RCM of the sequence of the uplink reference signal may be close to or even lower than those of the uplink data, so as to ensure that the receiving apparatus can accurately obtain, through demodulation, the received uplink data, thereby improving wireless communication performance.

The sending apparatus needs to transmit an uplink reference signal and uplink data on the frequency resource for the uplink data transmission. Therefore, the sending apparatus needs to generate the uplink reference signal and perform uplink-data mapping. Details are separately described in the following.

1. Generation of the Uplink Reference Signal

In this application, an example in which a sequence of the uplink reference signal is a Golay sequence is used for description. It should be noted that, in actual implementation, the sequence of the uplink reference signal may be a Golay sequence, or may be another sequence.

A Golay complementary sequence includes two complementary sequences with a same length, and in an aperiodic autocorrelation calculation result of the two sequences, all values except the first value are 0. In addition, either of the sequences in the Golay complementary sequence is a Golay sequence. A length of each sequence in the complete Golay complementary sequence is $2^a*10^b*26^c$, that is, the length M of the sequence of the uplink reference signal in this application meets $M=2^a*10^b*26^c$, where a is a non-negative integer, b is a non-negative integer, and c is a non-negative integer.

For example, it is assumed that an allocated frequency resource includes a maximum of 100 resource blocks (RB). A quantity K of RBs needs to meet $K=2^d*3^e*5^f$, where d is a non-negative integer, e is a non-negative integer, and f is a non-negative integer. Therefore, there are a total of 34 allocatable bandwidth configurations. In addition, an example in which one RB is 12 subcarriers is used; and M is a maximum value of all possible values, to be specific, M is a maximum value of all possible values that meet $M=2^a*10^b*26^c$ and that are less than N. In this case, a correspondence between the quantity (K) of allocated RBs, a subcarrier quantity (N), and a Golay sequence length (M) is shown in Table 1.

TABLE 1

Correspondence between the quantity (K) of allocated RBs, the subcarrier quantity (N), and the Golay sequence length (M)

| Quantity (K) of allocated RBs | 1 | 2 | 3 | 4 | 5 | 6 | 8 | 9 | 10 |
|---|---|---|---|---|---|---|---|---|---|
| Subcarrier quantity (N) | 12 | 24 | 36 | 48 | 60 | 72 | 96 | 108 | 120 |
| Golay sequence length (M) | 10 | 20 | 32 | 40 | 52 | 64 | 80 | 104 | 104 |
| RB quantity (K) | 12 | 15 | 16 | 18 | 20 | 24 | 25 | 27 | 30 |
| Subcarrier quantity (N) | 144 | 180 | 192 | 216 | 240 | 288 | 300 | 324 | 360 |
| Golay sequence length (M) | 128 | 160 | 160 | 208 | 208 | 260 | 260 | 320 | 320 |
| RB quantity (K) | 32 | 36 | 40 | 45 | 48 | 50 | 54 | 60 | 64 |
| Subcarrier quantity (N) | 384 | 432 | 480 | 540 | 576 | 600 | 648 | 720 | 768 |
| Golay sequence length (M) | 320 | 416 | 416 | 520 | 520 | 520 | 640 | 676 | 676 |
| RB quantity (K) | 72 | 75 | 80 | 81 | 90 | 96 | 100 | | |
| Subcarrier quantity (N) | 864 | 900 | 960 | 972 | 1080 | 1152 | 1200 | | |
| Golay sequence length (M) | 832 | 832 | 832 | 832 | 1040 | 1040 | 1040 | | |

To be specific, referring to Table 1, if the quantity of the subcarriers included in the frequency resource that is indicated by the first indication information received by the sending apparatus is N=12, the length of the sequence of the uplink reference signal is M=10; if the quantity of the subcarriers included in the frequency resource that is indicated by the first indication information is N=72, the length of the sequence of the uplink reference signal is M=64; and the like. The length M of the sequence of the uplink reference signal may be obtained by the sending apparatus through calculation based on Table 1, or may be indicated by the receiving apparatus to the sending apparatus through the second indication information.

After determining the length M of the sequence of the uplink reference signal, the sending apparatus generates a Golay sequence with a length of M, and uses the generated Golay sequence as the sequence of the uplink reference signal.

For a manner for generating the Golay sequence with a length of M, refer to a Golay sequence generation manner in the prior art. Alternatively, the manner for generating the Golay sequence with a length of M may be the following generation manners provided in this application.

If M=10, the sequence (that is, the generated Golay sequence) of the uplink reference signal is one of Y(q), where Y(q)=(y(0), y(1), . . . , y(9)), and q=0, 1, . . . , 31 as listed in the following table:

| Y(q) | y(0) | y(1) | y(2) | y(3) | y(4) | y(5) | y(6) | y(7) | y(8) | y(9) |
|---|---|---|---|---|---|---|---|---|---|---|
| Y(0)  |  1 |  1 | −1 |  1 | −1 |  1 | −1 | −1 |  1 |  1 |
| Y(1)  |  1 |  1 | −1 |  1 |  1 |  1 |  1 |  1 | −1 | −1 |
| Y(2)  |  1 |  1 | −1 | −1 |  1 | −1 |  1 | −1 |  1 |  1 |
| Y(3)  | −1 | −1 |  1 |  1 |  1 |  1 |  1 | −1 |  1 |  1 |
| Y(4)  |  1 | −1 | −1 |  1 |  1 |  1 |  1 |  1 |  1 | −1 |
| Y(5)  | −1 |  1 |  1 | −1 |  1 | −1 |  1 |  1 |  1 | −1 |
| Y(6)  | −1 |  1 |  1 |  1 |  1 |  1 |  1 | −1 | −1 |  1 |
| Y(7)  | −1 |  1 |  1 |  1 | −1 |  1 | −1 |  1 |  1 | −1 |
| Y(8)  |  1 |  1 |  1 |  1 |  1 | −1 |  1 | −1 | −1 |  1 |
| Y(9)  |  1 |  1 | −1 | −1 |  1 |  1 | −1 |  1 | −1 |  1 |
| Y(10) |  1 | −1 | −1 |  1 | −1 |  1 |  1 |  1 |  1 |  1 |
| Y(11) | −1 |  1 | −1 |  1 |  1 |  1 | −1 | −1 |  1 |  1 |
| Y(12) |  1 |  1 | −1 | −1 | −1 | −1 |  1 | −1 |  1 | −1 |
| Y(13) | −1 | −1 | −1 | −1 |  1 | −1 |  1 |  1 |  1 | −1 |
| Y(14) | −1 |  1 | −1 |  1 | −1 | −1 | −1 |  1 |  1 |  1 |
| Y(15) | −1 |  1 |  1 | −1 | −1 |  1 | −1 | −1 | −1 | −1 |
| Y(16) | −1 |  1 | −1 |  1 | −1 |  1 |  1 |  1 |  1 |  1 |
| Y(17) |  1 | −1 |  1 |  1 |  1 |  1 | −1 | −1 |  1 |  1 |
| Y(18) |  1 |  1 |  1 |  1 | −1 | −1 |  1 | −1 |  1 |  1 |
| Y(19) |  1 | −1 | −1 |  1 |  1 |  1 |  1 | −1 |  1 |  1 |
| Y(20) |  1 | −1 |  1 | −1 | −1 |  1 |  1 |  1 |  1 |  1 |
| Y(21) | −1 | −1 |  1 |  1 | −1 |  1 |  1 |  1 |  1 |  1 |
| Y(22) |  1 |  1 |  1 |  1 |  1 | −1 |  1 |  1 | −1 |  1 |
| Y(23) |  1 |  1 |  1 | −1 |  1 | −1 |  1 | −1 | −1 |  1 |
| Y(24) |  1 |  1 |  1 |  1 | −1 |  1 | −1 | −1 |  1 |  1 |
| Y(25) | −1 |  1 | −1 |  1 |  1 | −1 | −1 |  1 |  1 |  1 |
| Y(26) |  1 |  1 | −1 | −1 |  1 | −1 |  1 |  1 |  1 |  1 |
| Y(27) |  1 |  1 |  1 | −1 |  1 |  1 | −1 |  1 | −1 |  1 |
| Y(28) | −1 |  1 |  1 | −1 |  1 | −1 | −1 |  1 | −1 |  1 |
| Y(29) | −1 |  1 | −1 |  1 | −1 |  1 |  1 | −1 | −1 | −1 |
| Y(30) |  1 | −1 |  1 | −1 |  1 |  1 |  1 |  1 |  1 | −1 |
| Y(31) | −1 | −1 | −1 | −1 |  1 |  1 | −1 | −1 |  1 | −1 |

For example, if Y(31) is selected as the sequence of the uplink reference signal, the sequence of the uplink reference signal is Y(31)=(−1,−1,−1,−1,1,1,−1,−1,1,−1). For another example, if Y(26) is selected as the sequence of the uplink reference signal, the sequence of the uplink reference signal is Y(26)=(1,1,−1,−1,1,−1,1,1,1,1).

Referring to Table 1, if M>10, for example, M is 20, 32, 40, or the like, in this application, the Golay sequence may be generated based on complementary base sequences, and there are the following several types of complementary base sequences:

a complementary base sequence with a length of 10: [[1,1,−1,1,−1,1,−1,−1,1,1], [1,1,−1,1,1,1,1,1,−1,−1]] or [[1,1,1,1,1,−1,1,−1,−1,1], [1,1,−1,−1,1,1,1,−1,1,−1]];

a complementary base sequence with a length of 16: [[−1,1,1,1,−1,1,−1,−1,1,1,−1,1,1,1,1,−1], [−1,1,1,1,1,−1,1,1,1,−1,1,−1,−1,−1,1]]; and a complementary base sequence with a length of 26: [[1,1,1,1,−1,1,1,−1,−1,1,−1,1,−1,1,1,−1,1,−1,1,1,1,1,−1,−1,1,1,1], [1,1,1,1,−1,1,1,−1,−1,1,−1,1,1,1,1,1,1,−1,1,−1,−1,−1,−1,1,1,−1,−1,−1]].

For example, if M=40, because 40=4*10, the Golay sequence may be generated through complementary base sequences with a length of 10: if M=260, because 260=26*10, the Golay sequence may be generated through the complementary base sequence with a length of 10 and the complementary base sequence with a length of 26.

In a possible design, a Golay complementary sequence with a length of K may be used for generating a Golay complementary sequence with a length of 2K by using the following methods:

The Golay complementary sequence with a length of 2K is defined as $[C, D]=[[c_0, c_1, \ldots, c_{2K-1}], [d_0, d_1, \ldots, d_{2K-1}]]$, where $C=A|B$, $D=A|(-B)$, $A=[a_0, a_1, \ldots, a_{K-1}]$, $B=[b_1, b_2, \ldots, b_{K-1}]$, and $A|B$ indicates that the sequence A is jointed to the sequence B, that is, $A|B=[a_0, a_1, \ldots, a_{K-1}, b_1, b_2, \ldots, b_{K-1}]$.

$A|(-B)$ indicates the following: Each element of the sequence B is multiplied by −1 to obtain −B; and then the sequence A is jointed to the sequence (−B), that is, $A|(-B)=[a_0, a_1, \ldots, a_{K-1}, -b_1, -b_2, \ldots, -b_{K-1}]$.

It should be noted that, the above methods are merely examples, and there are also another generation method.

For another example, a Golay complementary sequence with a length of K*L may be generated through a Golay complementary sequence with a length of K and a Golay complementary sequence with a length of L, and details are as follows:

The Golay complementary sequence with a length of L is defined as $[C,D]=[[c_0, c_1, \ldots, c_{L-1}], [d_0, d_1, \ldots, d_{L-1}]]$, and the Golay complementary sequence with a length of K*L is defined as $[E,F]=[[e_0, e_1, \ldots, e_{KL-1}], [f_0, f_1, \ldots, f_{KL-1}]]$, where:

$E=\frac{1}{2}[(C+D)\otimes A+(C-D)\otimes B^*]$ $E=\frac{1}{2}[(C+D)\otimes B-(C-D)\otimes A^*]$ A* is a reverse sequence of the sequence A, that is, $A^*=[a_{K-1}, a_K, \ldots, a_0]$; B* is a reverse sequence of the sequence B, that is, $B^*=[b_{K-1}, b_K, \ldots, b_0]$; and $(C+D)\otimes A=C\otimes A+D\otimes A$, $(C-D)\otimes B^*=C\otimes B^*-D\otimes B^*$, $(C+D)\otimes B=C\otimes B+D\otimes B$, and $(C-D)\otimes A^*=C\otimes A^*-D\otimes A^*$.

$C\otimes A=[c_0A, c_1A, \ldots, c_{L-1}A]$, that is, each element of the sequence C is multiplied by the sequence A, and then all multiplication results are jointed successively together to obtain a sequence with a length of K*L.

$C\otimes B=[c_0B, c_1B, \ldots, c_{L-1}B]$, that is, each element of the sequence C is multiplied by the sequence B, and then all multiplication results are jointed successively together to obtain a sequence with a length of K*L.

$C\otimes A^*=[c_0A^*, c_1A^*, \ldots, c_LA^*]$, that is, each element of the sequence C is multiplied by the sequence A*, then all multiplication results are jointed successively together to obtain a sequence with a length of K*L.

$C\otimes B^*=[c_0B^*, c_1B^*, \ldots, c_{L-1}B^*]$, that is, each element of the sequence C is multiplied by the sequenceB*, and then all multiplication results are jointed successively together to obtain a sequence with a length of K*L.

$D\otimes A=[d_0A, d_1A, \ldots, d_{L-1}A]$, that is, each element of the sequence D is multiplied by the sequence A. and then all multiplication results are jointed successively together to obtain a sequence with a length of K*L.

$D\otimes B=[d_0B, d_1B, \ldots, d_{L-1}B]$, that is, each element of the sequence D is multiplied by the sequence B, and then all multiplication results are jointed successively together to obtain a sequence with a length of K*L.

$D\otimes A^*=[d_0A^*, d_1A^*, \ldots, d_{L-1}A^*]$, that is, each element of the sequence D is multiplied by the sequence A*, and then all multiplication results are jointed successively together to obtain a sequence with a length of K*L.

$D\otimes B^*=[d_0B^*, d_1B^*, \ldots, d_{L-1}B^*]$, that is, each element of a sequence D is multiplied by a sequence B*, and then all multiplication results are jointed successively together to obtain a sequence with a length of K*L.

Therefore, based on the foregoing manner for generating a Golay complementary sequence, when a Golay complementary sequence with a length of 40 needs to be generated based on a complementary base sequence with a length of 10, the Golay complementary sequence with a length of 40 is generated based on the foregoing manner; when a Golay complementary sequence with a length of 260 needs to be generated based on a complementary base sequence with a length of 10 and a complementary base sequence with a length of 26, the Golay complementary sequence with a length of 260 may also be generated based on the foregoing manner.

In addition, the Golay complementary sequence with a length of M may be alternatively generated in another manner. M=260 is used as an example. After a Golay complementary sequence with a length of 260 is generated based on the foregoing method, operations such as negating every other element in any Golay sequence in the Golay complementary sequence or reversing any Golay sequence in the Golay complementary sequence are performed, so as to obtain a new Golay complementary sequence with a length of 260.

According to the foregoing method, after the Golay complementary sequence with a length of M is obtained, any Golay sequence in the Golay complementary sequence may be used as the sequence, needing to be used in this application, of the uplink reference signal.

After generating the sequence of the uplink reference signal and performing operations such as frequency-domain resource mapping, inverse fast Fourier transform (IFFT), and addition of a cyclic prefix (CP), the sending apparatus sends the uplink reference signal. Certainly, when transmitting the uplink reference signal, the uplink data is also sent. The following describes a method for mapping the uplink data to the frequency resource.

2. Mapping of the Uplink Data

The sending apparatus may obtain, through indication of the first indication information from the receiving apparatus, the quantity N of subcarriers included in the frequency resource; alternatively, the sending apparatus may obtain, through grant-free access, the quantity N of subcarriers; or the quantity N of subcarriers may be predefined.

The quantity of subcarriers is N, and therefore the sending apparatus needs to map the uplink data to the frequency resource corresponding to the N subcarriers. The following describes a complete process for mapping the uplink data to the frequency resource. The filter may be a frequency-domain filter or a time-domain filter. Therefore, the following provides descriptions separately.

1. Frequency Filter

Step 1: After performing operations such as encoding and rate matching on original bit stream data, the sending apparatus performs π/2 BPSK modulation to obtain N pieces of modulated data.

Step 2: The sending apparatus performs discrete Fourier transform (DFT) on the modulated data to obtain N pieces of frequency-domain data.

A DFT algorithm may be specifically, for example, fast Fourier Transform (FFT).

Step 3: The sending apparatus performs point multiplication on the N pieces of frequency-domain data and a frequency-domain filter, to obtain filtered frequency-domain data.

A roll-off factor of the frequency-domain filter is $$\frac{2M}{N} - 1.$$

Step 4: The sending apparatus maps the filtered frequency-domain data to the frequency resource, specifically, maps the filtered frequency-domain data to the N subcarriers of the frequency resource.

Step 5: The sending apparatus performs IFFT on the N piece of data on the frequency resource, and adds a cyclic prefix to the data, to obtain one single-carrier time-domain data symbol.

Through the foregoing steps 1 to 5, mapping of the uplink data is completed. Subsequently, the uplink data may be sent. Certainly, when the uplink data is sent, the uplink reference signal is also sent. For details, refer to the foregoing descriptions.

In the foregoing step 3, the sending apparatus filters the frequency-domain data through the frequency-domain filter. An important filtering parameter of the frequency-domain filter is a roll-off factor, where the roll-off factor is used to indicate a parameter of a bandwidth obtained by subtracting a Nyquist bandwidth from a bandwidth of the filter. If the Nyquist bandwidth is W, and the bandwidth obtained by subtracting the Nyquist bandwidth from the bandwidth of the filter is Δf the roll-off factor of the filter is Δf/W. The bandwidth of the filter may be adjusted through adjustment of the roll-off factor of the filter.

For example, a root raised cosine (SRRC) frequency-domain filter is used. For the filter with N coefficients, a filter coefficient may be indicated by $S_{N \times 1} = [S_{(N-M)/2 \times 1}^{l}; S_{M \times 1}^{m}; S_{(N-M)/2 \times 1}^{r}]$, and a Nyquist bandwidth is N/2. The filter herein is a column vector, or may be a row vector. When a roll-off factor of the frequency-domain filter is $$\frac{2M}{N} - 1,$$

a bandwidth of the filter is $$\left(\frac{2M}{N} - 1\right) * N/2 + N/2 = M,$$

that is, the first (N−M)/2 coefficients and the last (N−M)/2 coefficients of the N-point frequency-domain filter corresponding to the roll-off factor (that is, $S_{(N-M)/2 \times 1}^{l}$ and $S_{(N-M)/2 \times 1}^{r}$) are 0 or almost 0, a quantity of M intermediate coefficients (that is, $S_{M \times 1}^{m}$) is the same as the length of the sequence of the uplink reference signal, both of which are M. For example, a root raised cosine frequency-domain filter corresponding to one RB is used, that is, N=12. When M=10, normalized frequency-domain filter coefficients are [0, 0.0565, 0.5346, 1.0023, 1.3059, 1.4163, 1.4108, 1.4163, 1.3059, 1.0023, 0.5346, 0.0565], where the first value is 0, the last value is 0.0565, the first value and the last value account for a small proportion in all the filter coefficients, and can be ignored.

Figure 4A:
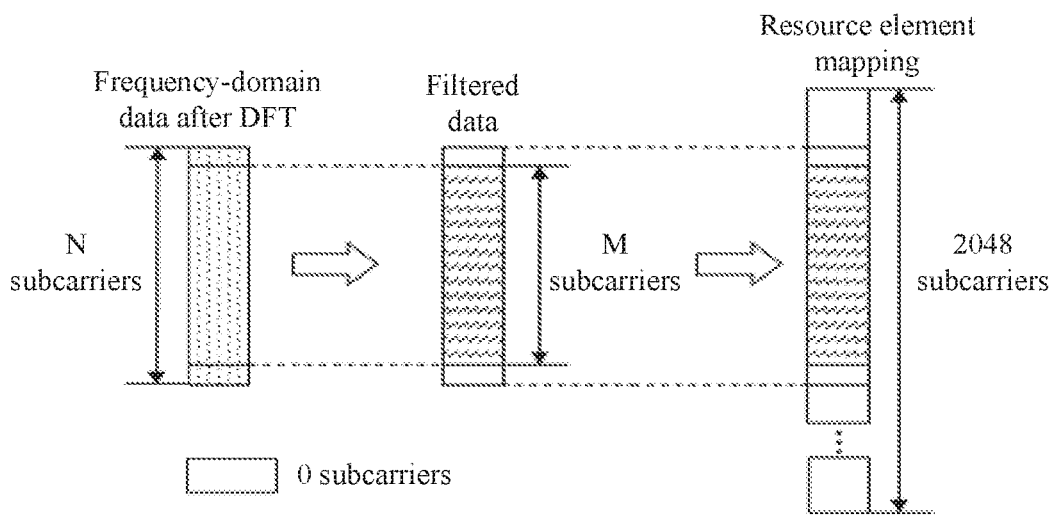
FIG. 4(*a*) is a schematic diagram of mapping data to subcarriers of a frequency resource according to this application.

The N pieces of π/2 BPSK modulated data are transformed to the frequency-domain data respectively through N-point Fourier transform, and point multiplication is performed on the frequency-domain data and the N frequency-domain filter coefficients in a one-to-one manner, to obtain the N pieces of filtered frequency-domain data, and the N pieces of filtered frequency-domain data are mapped to corresponding subcarrier locations in a resource element mapping manner, where values on subcarriers in other locations are 0; subsequently, the frequency-domain data is transformed to time-domain data through IFFT transform. FIG. 4(a) is a schematic diagram of mapping data to subcarriers of a frequency resource. In this case, locations to which a sequence of an uplink reference signal with a length of M is mapped are consistent with locations to which M pieces of intermediate frequency-domain data of N piece of filtered frequency-domain data, or in other words, a frequency resource occupied by the sequence of the uplink reference signal is M intermediate subcarriers of N subcarriers occupied by uplink data. An example in which N=12 and M=10 is used. The subcarrier locations to which the filtered frequency-domain data is mapped are P=[p(0), p(1), . . . , p(11)], and the locations to which the sequence of the uplink reference signal is mapped are p(1), p(2), . . . , p(10).

Figure 4B:
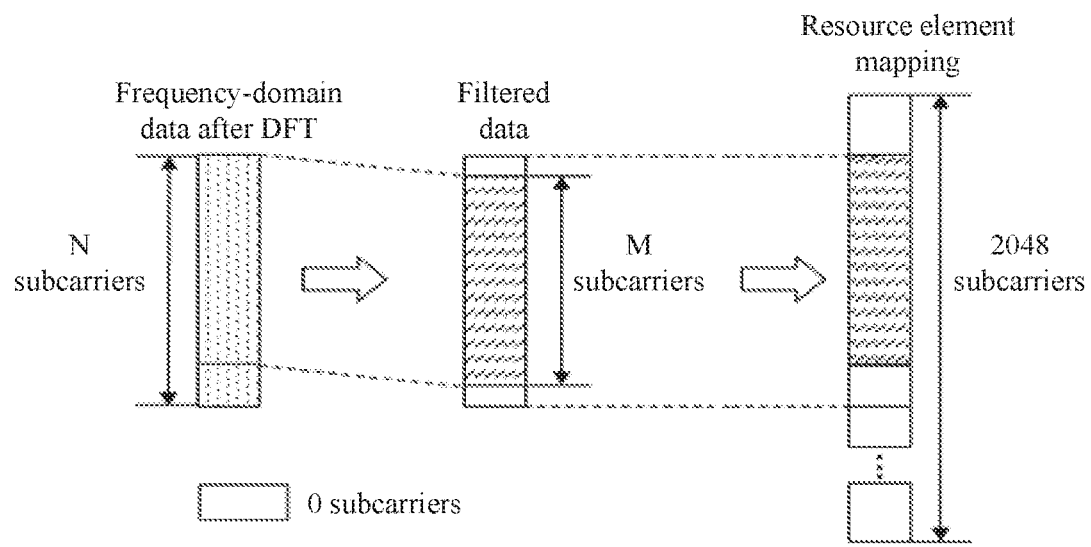

FIG. 4(b) is another schematic diagram of mapping data to subcarriers of a frequency resource according to this application. First, continuous M pieces of frequency-domain data in any locations in N pieces of frequency-domain data are obtained, and point multiplication is performed on the continuous M pieces of frequency-domain data and M intermediate coefficients (that is, $S_{M \times 1}^{m}$) of a frequency-domain filter in a one-to-one manner, subsequently, frequency-domain data obtained through point multiplication performed on M pieces of frequency-domain data and a filter coefficient is mapped to locations of any continuous M subcarriers in N subcarriers, where other values of subcarriers in other locations are 0; and the frequency-domain data is transformed to time-domain data through IFFT transform. An example in which N=12 and M=10 is used. Referring to FIG. 4(b), for example, the first M pieces of frequency-domain data or M pieces of intermediate frequency-domain data, or continuous M pieces of frequency-domain data in other locations in the N pieces of frequency-domain data may be obtained, point multiplication is performed on the M pieces of frequency-domain data and M intermediate coefficients of the frequency-domain filter in a one-to-one manner to obtain M pieces of filtered frequency-domain data, and the M pieces of filtered frequency-domain data are mapped to any continuous M subcarriers of the N subcarriers of the frequency resource. In this case, locations to which an uplink reference signal with a length of M is mapped are consistent with locations to which the M pieces of filtered frequency-domain data are mapped, that is, the uplink reference signal and the M pieces of filtered frequency-domain data are mapped to same M subcarriers.

2. Time-Domain Filter

Step 1: After performing operations such as encoding and rate matching on original bit stream data, the sending apparatus performs π/2 BPSK modulation to obtain N pieces of modulated data.

Step 2: The sending apparatus performs DFT on the modulated data to obtain N pieces of frequency-domain data.

A DFT algorithm may be specifically, for example, FFT.

Step 3: The sending apparatus maps the N pieces of frequency-domain data to the frequency resource, specifically, maps the N pieces of frequency-domain data to N subcarriers of the frequency resource.

Step 4: The sending apparatus performs inverse discrete Fourier transform (IFFT) on the N pieces of frequency-domain data to obtain time-domain data, and convolution is performed on the obtained time-domain data and a coefficient of the time-domain filter to obtain filtered data.

A roll-off factor of the time-domain filter is $$\frac{2M}{N} - 1.$$

Step 5: The sending apparatus adds a cyclic prefix to the data on N frequency resources, to obtain one single-carrier time-domain data symbol.

If the filtered data obtained in step 4 is transformed to frequency-domain data through FFT, the following effect is achieved: In the N pieces of frequency-domain data mapped to the N subcarriers on the frequency resource, N-M pieces of data different from intermediate M pieces of data are 0 or close to 0, or in other words, an effect of filtering data by using the time-domain filter is the same as that by using the frequency-domain filter.

A main difference between a method for processing data by using the time-domain filter and a method for processing data by using the frequency-domain filter is as follows: When the time-domain filter is used, discrete Fourier transform is first performed on N pieces of frequency-domain data and then convolution is performed on obtained time-domain data and a coefficient of the time-domain filter; when the frequency-domain filter is used, point multiplication is first performed on N frequency-domain data and the frequency-domain filter and then discrete Fourier transform. Other processing processes between the two processing methods are relatively similar. For details, refer to the foregoing processing process performed by using the frequency-domain filter. Details are not described herein again.

In this application, the filter is used for filtering the uplink data, and the roll-off factor of the filter is adjustable. For example, when the roll-off factor of the filter may be not greater than $$\frac{2M}{N} - 1,$$

so that N-M pieces of data in N pieces of filtered uplink data are 0 or close to 0. In this way, the length of the sequence of the uplink reference signal only needs to be M, and it can be ensured that when receiving the N pieces of data and a sequence of an uplink reference signal with a length of M that is corresponding to M pieces of non-zero data of the N pieces of data, the receiving apparatus can accurately obtain, through demodulation, the N pieces of data sent by the sending apparatus. In this application, a length of a sequence of an uplink reference signal that is sent can be adjusted flexibly, and therefore it is easier to find an uplink reference signal sequence with a low PAPR and a low RCM, so that a PAPR and an RCM of the sequence of the uplink reference signal may be close to or even lower than those of the uplink data, so as to ensure that the receiving apparatus can accurately obtain, through demodulation, the received uplink data, thereby improving wireless communication performance.

In a possible design, the sequence of the uplink reference signal is a Golay sequence. Due to a feature of the Golay sequence, a PAPR and an RCM of the finally obtained sequence of the uplink reference signal is relatively close to or even lower than those of the uplink data.

In a possible design, the uplink data may be filtered by the frequency-domain filter, or may be filtered by the time-domain filter. For a specific process, refer to the foregoing descriptions.

In this application, the sending apparatus may be divided into function modules based on the foregoing method example. For example, the function modules may be obtained through division based on functions, and two or more functions may be integrated into one processing module. The integrated module may be implemented in a form of hardware, or may be implemented in a form of a software functional module. It should be noted that, in this application, module division is an example, and is merely a logical function division. In actual implementation, another division manner may be used.

Figure 5:
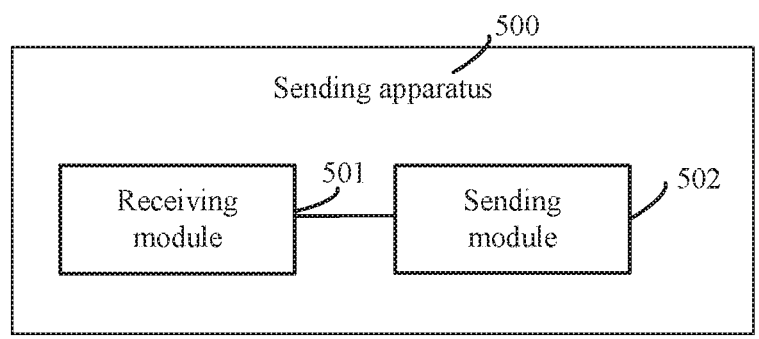
FIG. 5 is a schematic diagram of another sending apparatus according to this application.

For example, when function module division is performed by function, FIG. 5 is a possible schematic structural diagram of the sending apparatus in the foregoing embodiment. The apparatus 500 includes a receiving module 501 and a sending module 502.

The receiving module 501 is configured to receive first indication information for uplink data transmission, where the first indication information is used to indicate a frequency resource for the uplink data transmission, and the frequency resource includes N subcarriers.

The sending module 502 is configured to send an uplink reference signal associated with the uplink data transmission, where a length of a sequence of the uplink reference signal is M.

A roll-off factor of a filter for the uplink data transmission is not greater than $$\frac{2M}{N} - 1,$$

and N/2≤M<N, where N is a positive integer, and M is a positive integer.

In a possible implementation, the length of the sequence of the uplink reference signal is determined based on received second indication information.

In a possible implementation, a frequency resource occupied by the sequence of the uplink reference signal is M intermediate subcarriers of the N subcarriers.

In a possible implementation, a modulation scheme of the uplink data transmission is $S_{(N-M)/2 \times 1}^{1}$ binary phase shift keying BPSK.

In a possible implementation, when M=10, the sequence of the uplink reference signal is one of Y(q), where Y(q)= (y(0), y(1), ..., y(9)), and q=0, 1, ..., 31, as listed in the following table:

| Y(q) | y(0) | y(1) | y(2) | y(3) | y(4) | y(5) | y(6) | y(7) | y(8) | y(9) |
|---|---|---|---|---|---|---|---|---|---|---|
| Y(0) | 1 | 1 | −1 | 1 | −1 | 1 | −1 | −1 | 1 | 1 |
| Y(1) | 1 | 1 | −1 | 1 | 1 | 1 | 1 | 1 | −1 | −1 |
| Y(2) | 1 | 1 | −1 | −1 | 1 | −1 | 1 | −1 | 1 | 1 |
| Y(3) | −1 | −1 | 1 | 1 | 1 | 1 | 1 | −1 | 1 | 1 |
| Y(4) | 1 | −1 | −1 | 1 | 1 | 1 | 1 | 1 | 1 | −1 |
| Y(5) | −1 | 1 | 1 | −1 | 1 | −1 | 1 | 1 | 1 | −1 |
| Y(6) | −1 | 1 | 1 | 1 | 1 | 1 | 1 | −1 | −1 | 1 |
| Y(7) | −1 | 1 | 1 | 1 | −1 | 1 | −1 | 1 | 1 | −1 |
| Y(8) | 1 | 1 | 1 | 1 | 1 | −1 | 1 | −1 | −1 | 1 |
| Y(9) | 1 | 1 | −1 | −1 | 1 | 1 | 1 | −1 | 1 | −1 |
| Y(10) | 1 | −1 | −1 | 1 | −1 | 1 | 1 | 1 | 1 | 1 |
| Y(11) | −1 | 1 | −1 | 1 | 1 | 1 | −1 | −1 | 1 | 1 |
| Y(12) | 1 | 1 | −1 | −1 | −1 | −1 | 1 | −1 | 1 | −1 |
| Y(13) | −1 | −1 | −1 | −1 | 1 | −1 | −1 | 1 | 1 | −1 |
| Y(14) | −1 | 1 | −1 | 1 | −1 | −1 | −1 | −1 | 1 | 1 |
| Y(15) | −1 | 1 | 1 | −1 | 1 | 1 | −1 | −1 | −1 | −1 |
| Y(16) | −1 | 1 | −1 | 1 | −1 | −1 | 1 | 1 | 1 | 1 |
| Y(17) | 1 | −1 | 1 | 1 | 1 | 1 | 1 | −1 | −1 | 1 |
| Y(18) | 1 | 1 | 1 | 1 | −1 | −1 | 1 | −1 | 1 | −1 |
| Y(19) | 1 | −1 | −1 | 1 | 1 | 1 | 1 | 1 | −1 | 1 |
| Y(20) | 1 | −1 | 1 | −1 | −1 | 1 | 1 | 1 | 1 | 1 |
| Y(21) | −1 | −1 | 1 | 1 | −1 | 1 | −1 | 1 | 1 | 1 |
| Y(22) | 1 | 1 | 1 | 1 | 1 | −1 | −1 | 1 | −1 | 1 |
| Y(23) | 1 | 1 | 1 | −1 | 1 | −1 | 1 | 1 | −1 | −1 |
| Y(24) | 1 | 1 | 1 | 1 | −1 | 1 | −1 | −1 | 1 | 1 |
| Y(25) | −1 | 1 | −1 | 1 | 1 | −1 | −1 | 1 | 1 | 1 |
| Y(26) | 1 | 1 | −1 | −1 | 1 | −1 | 1 | 1 | 1 | 1 |
| Y(27) | 1 | 1 | 1 | −1 | −1 | 1 | 1 | −1 | 1 | −1 |
| Y(28) | −1 | 1 | 1 | −1 | −1 | −1 | 1 | 1 | −1 | 1 |
| Y(29) | −1 | 1 | −1 | −1 | 1 | 1 | −1 | −1 | −1 | −1 |
| Y(30) | 1 | −1 | 1 | −1 | −1 | −1 | −1 | 1 | 1 | −1 |
| Y(31) | −1 | −1 | −1 | −1 | 1 | 1 | −1 | −1 | 1 | −1 |

In a possible implementation, the sequence of the uplink reference signal is a Golay sequence, and the Golay sequence is generated from at least one of the following complementary base sequences:

a complementary base sequence with a length of 10: [[1,1,−1,1,−1,1,−1,−1,1,1], [1,1,−1,1,1,1,1,1,−1,−1]] or [[1, 1,1,1,1,−1,1,−1,−1,1], [1,1,−1,−1,1,1,1,−1,1,−1]];

a complementary base sequence with a length of 16: [[−1,1,1,1,−1,1,−1,−1,1,1,−1,1,1,1,1,−1], [−1,1,1,1,1,1,−1,1,1, 1,1,−1,1,−1,−1,−1,1]]; and a complementary base sequence with a length of 26: [[1,1,1,1,−1,1,1,−1,−1,1,−1,1,1,−1,1,1,−,1,−1,1,1,1,−1,−1,1, 1,1], [1,1,1,1,−1,1,1,−1,−1,1−1,1,1,1,1,1,1,−1,1,−1,−1,−1,1, 1,−1,−1,−1]].

In a possible implementation, the sequence of the uplink reference signal is a Golay sequence, and $M=2^{a}*10^{b}*26^{c}$, where a is a non-negative integer, b is a non-negative integer, c is a non-negative integer, and M is a maximum value of all possible values.

The sending module 502 may be a transmitter, and the receiving module 501 may be a receiver. It should be understood that the sending apparatus 500 may be configured to implement steps of the terminal in the sending method in the embodiments of the present invention. For a related feature, refer to the foregoing descriptions. Details are not described herein again.

This application further provides a computer storage medium. The computer storage medium is configured to store a computer software instruction used by the sending apparatus shown in FIG. 2 or FIG. 5, and includes program code designed for executing the foregoing method embodiment. Through execution of the stored program code, wireless communication performance can be improved.

This application further provides a computer program product. The computer program product includes a computer software induction, where the computer software induction may be loaded by a processor to implement the method in the foregoing method embodiment.

Figure 6:
FIG. 6 shows a chip according to this application.

This application further provides a chip. As shown in FIG. 6, the chip includes a processor 61 and a memory 62. The memory 62 stores a computer execution instruction. The processor 61 is connected to the memory 62, and the processor 61 executes the computer execution instruction stored in the memory 62, so that the chip executes the sending method in this application. For a specific implementation method thereof, refer to the descriptions of the foregoing embodiments. Details are not described herein again.

Although the present invention is described with reference to the embodiments, in a process of implementing the present invention that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), or a computer program product. Therefore, this application may use a form of hardware only embodiments, software only embodiments, or embodiments with a combination of software and hardware. They are collectively referred to as "modules" or "systems". Moreover, this application may use a form of a computer program product that is implemented on one or more computer-usable storage media (including but not limited to a disk memory, a CD-ROM, and an optical memory) that include computer usable program code. The computer program is stored/distributed in a proper medium and is provided as or used as a part of the hardware together with other hardware, or may also use another distribution form, such as through the Internet or another wired or wireless telecommunications system.

This application is described with reference to the flowcharts and/or block diagrams of the method, the apparatus (device), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that through instructions executed by a computer or a processor of another programmable data processing device, an apparatus for implementing a specific function in one or more processes in the flowcharts and/or in one or more blocks in the block diagrams are generated.

These computer program instructions may also be stored in a computer readable memory that can instruct the computer or another programmable data processing device to work in a specific manner, so that through the instructions stored in the computer readable memory, an artifact that includes an instruction apparatus is generated. The instruction apparatus implements a specific function in one or more processes in the flowcharts and/or in one or more blocks in the block diagrams.

These computer program instructions may also be loaded to a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

Although the present invention is described with reference to specific features and the embodiments thereof, obviously, various modifications and combinations may be made to them without departing from the spirit and scope of the present invention. Correspondingly, the specification and accompanying drawings are merely example description of the present invention defined by the accompanying claims, and is considered as any of or all modifications, variations, combinations or equivalents that cover the scope of the present invention. Obviously, a person skilled in the art can make various modifications and variations to the present invention without departing from the spirit and scope of the present invention. Therefore, the present invention is intended to cover these modifications and variations provided that they fall within the scope of protection defined by the following claims and their equivalent technologies.

What is claimed is:

1. A sending method performed by a terminal, comprising:
   receiving first indication information for uplink data transmission, wherein the first indication information is used to indicate a frequency resource for the uplink data transmission, and wherein the frequency resource comprises N subcarriers; and
   sending an uplink reference signal associated with the uplink data transmission, wherein a length of a sequence of the uplink reference signal is M, wherein a roll-off factor of a filter for the uplink data transmission is not greater than $$\frac{2M}{N} - 1,$$

wherein N/2≤M<N, wherein N is a positive integer, and wherein M is a positive integer.

2. The method according to claim 1, wherein the length of the sequence of the uplink reference signal is determined based on received second indication information.

3. The method according to claim 1, wherein a frequency resource occupied by the sequence of the uplink reference signal is M intermediate subcarriers of the N subcarriers.

4. The method according to claim 1, wherein a modulation scheme of the uplink data transmission is π/2 binary phase shift keying (BPSK).

5. The method according to claim 1, wherein:
   when M=10, the sequence of the uplink reference signal is one of Y(q), wherein Y(q)=(y(0),y(1), ..., y(9)), and q=0, 1, ... 3, 1, as listed in the following table:

| Y(q)  | y(0) | y(1) | y(2) | y(3) | y(4) | y(5) | y(6) | y(7) | y(8) | y(9) |
|-------|------|------|------|------|------|------|------|------|------|------|
| Y(0)  | 1    | 1    | −1   | 1    | −1   | 1    | −1   | −1   | 1    | 1    |
| Y(1)  | 1    | 1    | −1   | 1    | 1    | 1    | 1    | 1    | −1   | −1   |
| Y(2)  | 1    | 1    | −1   | −1   | 1    | −1   | 1    | −1   | 1    | 1    |
| Y(3)  | −1   | −1   | 1    | 1    | 1    | 1    | 1    | −1   | 1    | 1    |
| Y(4)  | 1    | −1   | −1   | 1    | 1    | 1    | 1    | 1    | 1    | −1   |
| Y(5)  | −1   | 1    | 1    | −1   | 1    | −1   | 1    | 1    | 1    | −1   |
| Y(6)  | −1   | 1    | 1    | 1    | 1    | 1    | 1    | −1   | −1   | 1    |
| Y(7)  | −1   | 1    | 1    | 1    | −1   | 1    | −1   | 1    | 1    | 1    |
| Y(8)  | 1    | 1    | 1    | 1    | 1    | −1   | 1    | −1   | −1   | 1    |
| Y(9)  | 1    | 1    | −1   | −1   | 1    | 1    | 1    | −1   | 1    | −1   |
| Y(10) | 1    | −1   | −1   | 1    | −1   | 1    | 1    | 1    | 1    | 1    |
| Y(11) | −1   | 1    | −1   | 1    | 1    | 1    | −1   | −1   | 1    | 1    |
| Y(12) | 1    | 1    | −1   | −1   | −1   | −1   | 1    | −1   | 1    | −1   |

-continued

| Y(q) | y(0) | y(1) | y(2) | y(3) | y(4) | y(5) | y(6) | y(7) | y(8) | y(9) |
|---|---|---|---|---|---|---|---|---|---|---|
| Y(13) | −1 | −1 | −1 | −1 | 1 | −1 | −1 | 1 | 1 | −1 |
| Y(14) | −1 | 1 | −1 | 1 | −1 | −1 | −1 | −1 | 1 | 1 |
| Y(15) | −1 | 1 | 1 | −1 | −1 | 1 | −1 | −1 | −1 | −1 |
| Y(16) | −1 | 1 | −1 | 1 | −1 | −1 | 1 | 1 | 1 | 1 |
| Y(17) | 1 | −1 | 1 | 1 | 1 | 1 | 1 | −1 | −1 | 1 |
| Y(18) | 1 | 1 | 1 | 1 | −1 | −1 | 1 | −1 | 1 | −1 |
| Y(19) | 1 | −1 | −1 | 1 | 1 | 1 | 1 | 1 | −1 | 1 |
| Y(20) | 1 | −1 | 1 | −1 | −1 | 1 | 1 | 1 | 1 | 1 |
| Y(21) | −1 | −1 | 1 | 1 | −1 | 1 | −1 | 1 | 1 | 1 |
| Y(22) | 1 | 1 | 1 | 1 | 1 | −1 | −1 | 1 | −1 | 1 |
| Y(23) | 1 | 1 | 1 | −1 | 1 | −1 | 1 | 1 | −1 | −1 |
| Y(24) | 1 | 1 | 1 | 1 | −1 | 1 | −1 | −1 | 1 | 1 |
| Y(25) | −1 | 1 | −1 | 1 | 1 | −1 | −1 | 1 | 1 | 1 |
| Y(26) | 1 | 1 | −1 | −1 | 1 | −1 | 1 | 1 | 1 | 1 |
| Y(27) | 1 | 1 | 1 | −1 | −1 | 1 | 1 | −1 | 1 | −1 |
| Y(28) | −1 | 1 | 1 | −1 | −1 | −1 | −1 | 1 | −1 | 1 |
| Y(29) | −1 | 1 | −1 | −1 | 1 | 1 | −1 | −1 | −1 | −1 |
| Y(30) | 1 | −1 | 1 | −1 | −1 | −1 | −1 | 1 | 1 | −1 |
| Y(31) | −1 | −1 | −1 | −1 | 1 | 1 | −1 | −1 | 1 | −1. |

6. The method according to claim 1, wherein the sequence of the uplink reference signal is a Golay sequence, and wherein the Golay sequence is generated from at least one of the following complementary base sequences:
   a complementary base sequence with a length of 10: [[1,1,−1,1,−1,1,−1,−1,1,1], [1,1,−1,1,1,1,1,1,−1,−1]] or [[1,1,1,1,1,−1,1,−1,−1,1], [1,1,−1,−1,1,1,1,−1,1,−1]];
   a complementary base sequence with a length of 16: [[−1,1,1,1,−1,1,−1,−1,1, 1,−1,1,1,1,1,−1], [−1,1,1,1,1,−1,1,1,1,1,−1,1,−1,−1,−1,1]]; and
   a complementary base sequence with a length of 26: [[1,1,1,1,−1,1,1,−1,−1,1,−1,1,−1,1,1,−1,−1,1,1,−1,−1,1,1,1,1], [1,1,1,1,−1,1,1,−1,−1,1,−1,1,1,1,1,1,1,−1,1,−1,−1,1,1,1,−1,−1,−1]].

7. The method according to claim 1, wherein the sequence of the uplink reference signal is a Golay sequence, wherein $M=2^a*10^b*26^c$, wherein a is a non-negative integer, wherein b is a non-negative integer, wherein c is a non-negative integer, and wherein M is a maximum value of all possible values.

8. A sending apparatus, comprising:
   a receiver, the receiver configured to receive first indication information for uplink data transmission, wherein the first indication information is used to indicate a frequency resource for the uplink data transmission, and wherein the frequency resource comprises N subcarriers; and
   a transmitter, the transmitter configured to send an uplink reference signal associated with the uplink data transmission, wherein a length of a sequence of the uplink reference signal is M, wherein a roll-off factor of a filter for the uplink data transmission is not greater than $$\frac{2M}{N} - 1,$$

wherein N/2≤M<N, wherein N is a positive integer, and wherein M is a positive integer.

9. The apparatus according to claim 8, wherein the length of the sequence of the uplink reference signal is determined based on received second indication information.

10. The apparatus according to claim 8, wherein a frequency resource occupied by the sequence of the uplink reference signal is M intermediate subcarriers of the N subcarriers.

11. The apparatus according to claim 8, wherein a modulation scheme of the uplink data transmission is π/2 binary phase shift keying (BPSK).

12. The apparatus according to claim 8, wherein:
   when M=10, the sequence of the uplink reference signal is one of Y(q), wherein Y(q)=(y(0),y(1), . . . , y(9)), and q=0, 1, . . . 3, 1, as listed in the following table:

| Y(q) | y(0) | y(1) | y(2) | y(3) | y(4) | y(5) | y(6) | y(7) | y(8) | y(9) |
|---|---|---|---|---|---|---|---|---|---|---|
| Y(0) | 1 | 1 | −1 | 1 | −1 | 1 | −1 | −1 | 1 | 1 |
| Y(1) | 1 | 1 | −1 | 1 | 1 | 1 | 1 | 1 | −1 | −1 |
| Y(2) | 1 | 1 | −1 | −1 | 1 | −1 | 1 | −1 | 1 | 1 |
| Y(3) | −1 | −1 | 1 | 1 | 1 | 1 | 1 | −1 | 1 | 1 |
| Y(4) | 1 | −1 | −1 | 1 | 1 | 1 | 1 | 1 | 1 | −1 |
| Y(5) | −1 | 1 | 1 | −1 | 1 | −1 | 1 | 1 | 1 | −1 |
| Y(6) | −1 | 1 | 1 | 1 | 1 | 1 | 1 | −1 | −1 | 1 |
| Y(7) | −1 | 1 | 1 | 1 | −1 | 1 | −1 | 1 | 1 | −1 |
| Y(8) | 1 | 1 | 1 | 1 | 1 | −1 | 1 | −1 | −1 | 1 |
| Y(9) | 1 | 1 | −1 | −1 | 1 | 1 | 1 | 1 | 1 | −1 |
| Y(10) | 1 | −1 | −1 | 1 | −1 | 1 | 1 | 1 | 1 | 1 |
| Y(11) | −1 | 1 | −1 | 1 | 1 | 1 | −1 | −1 | 1 | 1 |
| Y(12) | 1 | 1 | −1 | −1 | −1 | −1 | 1 | −1 | 1 | −1 |
| Y(13) | −1 | −1 | −1 | −1 | 1 | −1 | −1 | 1 | 1 | −1 |
| Y(14) | −1 | 1 | −1 | 1 | −1 | −1 | −1 | −1 | 1 | 1 |
| Y(15) | −1 | 1 | 1 | −1 | 1 | −1 | −1 | −1 | −1 | −1 |
| Y(16) | −1 | 1 | −1 | 1 | −1 | −1 | 1 | 1 | 1 | 1 |
| Y(17) | 1 | −1 | 1 | 1 | 1 | 1 | 1 | −1 | −1 | 1 |
| Y(18) | 1 | 1 | 1 | 1 | −1 | −1 | 1 | −1 | 1 | −1 |

-continued

| Y(q) | y(0) | y(1) | y(2) | y(3) | y(4) | y(5) | y(6) | y(7) | y(8) | y(9) |
|---|---|---|---|---|---|---|---|---|---|---|
| Y(19) | 1 | −1 | −1 | 1 | 1 | 1 | 1 | 1 | −1 | 1 |
| Y(20) | 1 | −1 | 1 | −1 | −1 | 1 | 1 | 1 | 1 | 1 |
| Y(21) | −1 | −1 | 1 | 1 | −1 | 1 | −1 | 1 | 1 | 1 |
| Y(22) | 1 | 1 | 1 | 1 | 1 | −1 | −1 | 1 | −1 | 1 |
| Y(23) | 1 | 1 | 1 | −1 | 1 | −1 | 1 | 1 | −1 | −1 |
| Y(24) | 1 | 1 | 1 | 1 | −1 | 1 | −1 | −1 | 1 | 1 |
| Y(25) | −1 | 1 | −1 | 1 | 1 | −1 | −1 | 1 | 1 | 1 |
| Y(26) | 1 | 1 | −1 | −1 | 1 | −1 | 1 | 1 | 1 | 1 |
| Y(27) | 1 | 1 | 1 | −1 | −1 | 1 | 1 | −1 | 1 | −1 |
| Y(28) | −1 | 1 | 1 | −1 | −1 | −1 | −1 | 1 | −1 | 1 |
| Y(29) | −1 | 1 | −1 | −1 | 1 | 1 | −1 | −1 | −1 | −1 |
| Y(30) | 1 | −1 | 1 | −1 | −1 | −1 | −1 | 1 | 1 | −1 |
| Y(31) | −1 | −1 | −1 | −1 | 1 | 1 | −1 | −1 | 1 | −1. |

13. The apparatus according to claim 8, wherein the sequence of the uplink reference signal is a Golay sequence, and wherein the Golay sequence is generated from at least one of the following complementary base sequences:

a complementary base sequence with a length of 10: [[1,1,−1,1,−1,1,−1,−1,1,1], [1,1,−1,1,1,1,1,1,−1,−1]] or [[1,1,1,1,1,−1,1,−1,−1,1], [1,1,−1,−1,1,1,1,−1,1,−1]] a complementary base sequence with a length of 16: [[−1,1,1,1,−1,1,−1,−1,1,1,−1,1,1,1,1,−1], [−1,1,1,1,1,−1,1,1,1,1,−1,1,−1,−1,−1,1]]; and a complementary base sequence with a length of 26: [[1,1,1,1,−1,1,1,−1,−1,1,−1,1,−1,1,−1,−1,1,−1,1,1,1,−1,1,1,1], [1,1,1,1,−1,1,1,−1,−1,1,−1,1,1,1,1,1,−1,1,−1,−1,−1,1,1,−1,−1,−1]].

14. The apparatus according to claim 8, wherein the sequence of the uplink reference signal is a Golay sequence, wherein $M=2^a*10^b*26^c$, wherein a is a non-negative integer, wherein b is a non-negative integer, wherein c is a non-negative integer, and wherein M is a maximum value of all possible values.

* * * * *